United States Patent
Utsunomiya

(10) Patent No.: US 6,999,186 B2
(45) Date of Patent: Feb. 14, 2006

(54) MULTI-COPY PRINTING APPARATUS AND IT'S CONTROL METHOD

(75) Inventor: Takeshi Utsunomiya, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 914 days.

(21) Appl. No.: 09/934,854

(22) Filed: Aug. 23, 2001

(65) Prior Publication Data

US 2002/0026463 A1    Feb. 28, 2002

(30) Foreign Application Priority Data

Aug. 23, 2000  (JP)  ............................. 2000-252820
Jul. 25, 2001  (JP)  ............................. 2001-224937

(51) Int. Cl.
G06K 15/02    (2006.01)
G06F 3/12     (2006.01)

(52) U.S. Cl. .................. 358/1.13; 358/1.15; 358/1.16; 399/85

(58) Field of Classification Search ................. 358/1.9, 358/1.15, 1.13, 1.16, 1.17, 1.2; 355/81, 82, 355/84; 399/38, 43, 82, 85, 381, 383, 145, 399/72, 53, 46, 45

See application file for complete search history.

(56) References Cited

U.S. PATENT DOCUMENTS 6,404,930 B1 *  6/2002  Inuzuka et al. ............. 382/235
6,832,187 B1 * 12/2004  Dow et al. .................... 703/27

* cited by examiner

Primary Examiner—King Y. Poon
Assistant Examiner—Lucas Divine
(74) Attorney, Agent, or Firm—Fitzpatrick, Cella, Harper & Scinto

(57) ABSTRACT

Upon receiving print data from a host, the print data is saved, and an image information generation module generates rasterized image data and saves it in a rasterized image storage means after compression. At this time, a time T1 required for analysis is measured. The stored rasterized image data is output to an engine, and a time T4 required for reading out and outputting the data at that time is also measured. The times T1 and T4 are compared. If T4>T1, a print process is done by generating rasterized image data from the print data for the second and subsequent copies; if T4<T1, the stored rasterized image data is read out and printed. In a color print process, rasterized image data is generated from the print data to execute a print process, thus activating a color correction function.

36 Claims, 11 Drawing Sheets

MULTI-COPY PRINTING APPARATUS AND IT'S CONTROL METHOD

FIELD OF THE INVENTION

The present invention relates to a printing apparatus and, more particularly, to a printing apparatus having a multi-copy print function and its control method.

BACKGROUND OF THE INVENTION

Upon printing a plurality of copies of a given print by a conventional printing apparatus, a first method of storing print data received from, e.g., a host computer in a first storage unit, and printing the plurality of copies using the stored print data, and a second method of generating rendering image data such as a dot image or the like from the print data stored in the first storage unit, storing the rendering image data in a second storage unit, and printing the plurality of copies using the rendering image data stored in the second storage unit may be used.

The conventional printing apparatus supports one of the first and second methods, and even when both the methods are supported, a plurality of copies can only be printed using one method selected by the user.

In the printing apparatus that supports both the methods, the first and second methods often have different processing speeds depending on the contents of data to be printed, and the best performance cannot be obtained unless a method suitable for the data contents is selected. For example, when given data is to be printed, the first method can complete processing in a shorter period of time than the second method. However, when another data is to be printed, the second method can complete processing in a shorter period of time than the first method. In this case, only when a method that can complete processing in a shorter period of time is designated depending on data contents, the best performance can be obtained.

However, in such printing apparatus, it is difficult for the user to determine a method suitable for given data.

In a color printing apparatus having an engine with a density correction function, when a plurality of copies of a color document or the like are printed, a density correction process is done upon generating rendering image data. For this reason, in the first method that re-generates rendering image data for each copy, since density correction is done for each copy, the tincture never changes during the print process even when the density state of the engine has changed along with an elapse of time.

By contrast, in the second method, since a plurality of copies are printed by repetitively referring to the rendering image data generated at the beginning of the process, if the density state of the engine has changed along with an elapse of time after generation of the rendering image data, the chromaticness may change during the print processes of the plurality of copies.

SUMMARY OF THE INVENTION

The present invention has been made in consideration of the prior art, and has as its first object to provide a printing apparatus which selects a method suitable for the contents of data to be printed, and prints using the selected method to obtain the best performance, and its control method.

It is the second object of the present invention to provide a printing apparatus which selects a print method suitable for the arrangement of a printing apparatus, and prints using the selected print method, so as to prevent the chromaticness from changing during print processes of a plurality of copies, even when the apparatus has a density correction function for color print.

In order to solve the aforementioned problems, the present invention comprises the following arrangement.

That is, a printing apparatus which has print means, and a multi-copy print function, comprises:

first storage means for storing print data;

image generation means for reading out the print data from the first storage means, and generating image data;

second storage means for storing the image data;

first measurement means for measuring a first time required for generating the image data by the image generation means;

second measurement means for measuring a second time required for reading out the image data from the second storage means;

comparison means for comparing the first and second times; and selection means for selecting as a print method a first method which prints based on the print data stored in the first storage means for each copy, and a second method that prints based on the image data stored in the second storage means for each copy, on the basis of the result of the comparison means.

Preferably, the first and second measurement means measure the first and second times upon printing a first copy of a plurality of copies, and the selection means determines the print method for second and subsequent copies.

Preferably, the second storage means compresses and stores the image data.

Preferably, the print means is color print means having a density correction function, and when print data is color data, the selection means selects the first method irrespective of the result of the comparison means.

Preferably, the selection means selects the print method for each print job.

Preferably, the selection means selects the print method for each print page.

Preferably, when one of the first and second methods is designated as the print method, the selection means selects the designated method as the print method.

Preferably, the apparatus further comprises correction input means for externally inputting density correction data, and when density correction data is externally input, the image generation means reads out the print data from the first storage means, generates the image data again in accordance with the input density correction data, and stores the generated image data in the second storage means irrespective of the print method selected.

Preferably, the apparatus further comprises means for reading an image printed on a paper sheet during a print process, and means for generating density correction data on the basis of the read image.

Preferably, when the second method is selected as the print method, the image generation means reads out the print data from the first storage means at a predetermined timing, analyzes the data to generate image data, and stores the generated image data in the second storage means to update old data.

Preferably, the apparatus further comprises re-print means for holding the print data of the first storage means, the image data of the second storage means, and the measurement results of the first and second measurement means, and printing in accordance with a re-print instruction.

Preferably, the apparatus further comprises means for reading out the print data from the first storage means during a print data waiting time, controlling the image generation means to analyze the data to generate image data, and storing the image data in the second storage means to update old data.

Preferably, a predetermined value is pre-stored as the second time, the first time and the predetermined value are compared without holding the image data upon printing the first copy, and the selection means selects as the print method the first method when the first time is smaller than the predetermined value or the second method when the first time is larger than the predetermined value.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

[First Embodiment]

The arrangement of a laser beam printer to which the first and second embodiments are suitably applied will be described below with reference to FIG. 1. Note that the printer of this embodiment is a laser beam printer that adopts electrophotography. However, the print scheme is not limited to such specific scheme, and printers of other print schemes such as an ink-jet printer may be used.

<Arrangement of Printer (FIGS. 1 and 2)>

Figure 1:
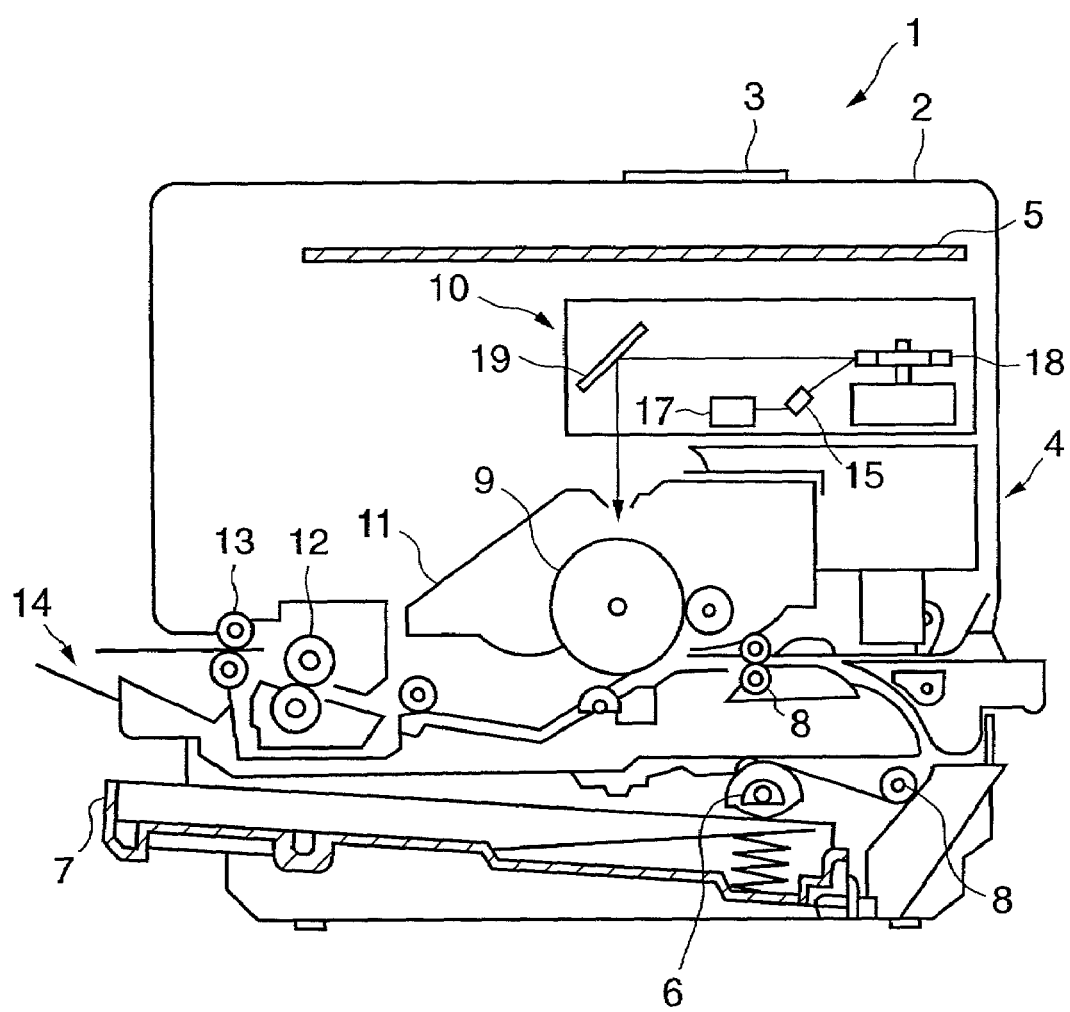
FIG. 1 is a sectional view showing the arrangement of a printer according to an embodiment of the present invention.

FIG. 1 shows the arrangement of a laser beam printer (LBP) to which the present invention can be applied.

A laser beam printer 1 comprises a control panel 3 which is provided on the upper surface of an apparatus main body 2, and has a switch unit, LED display, and the like, a print main body unit 4 for making a predetermined print operation, and a print controller 5 for controlling the print operation of the print main body unit 4 by analyzing input character data, control data, and the like.

The print main body unit 4 comprises a paper cassette 7 which stores predetermined print sheets (cut sheets) and comprises a pickup roller 6, an electrostatic drum 9 to which a print sheet is supplied via an appropriate number of convey rollers 8, an optical system 10 for irradiating the electrostatic drum 9 with a laser beam, a developer 11 which stores predetermined color toner, and is disposed around the electrostatic drum 9, a fixing device 12 for fixing a toner image developed by the developer 11, and an exhaust unit 14 for exhausting a recording sheet printed with document data or the like outside the apparatus via exhaust rollers 13.

Also, the print main body unit 4 comprises a semiconductor laser 15 for emitting a laser beam of a predetermined wavelength, a laser driver 17 for driving the semiconductor laser 15, a rotary polygonal mirror 18, and a reflecting mirror 19 for reflecting the laser beam that comes via the rotary polygonal mirror 18, and guiding it onto the electrostatic drum 9.

In the laser beam printer 1 with this arrangement, a video signal output from the print controller 5 is input to the laser driver 17, which turns on/off a laser beam to be emitted by the semiconductor laser 15 in accordance with the video signal. The laser beam is horizontally deflected by the rotary polygonal mirror 18 to scan on the electrostatic drum 9. An electrostatic latent image of, e.g., a character pattern and the like is formed on the electrostatic drum 9, and is developed via the developer 11. A toner image attached on the electrostatic drum 9 is transferred onto a print sheet fed from the paper cassette 7, and is fixed on the print sheet by the fixing device 12. The print sheet is exhausted onto the exhaust unit 14 via the exhaust rollers 13.

Figure 2:
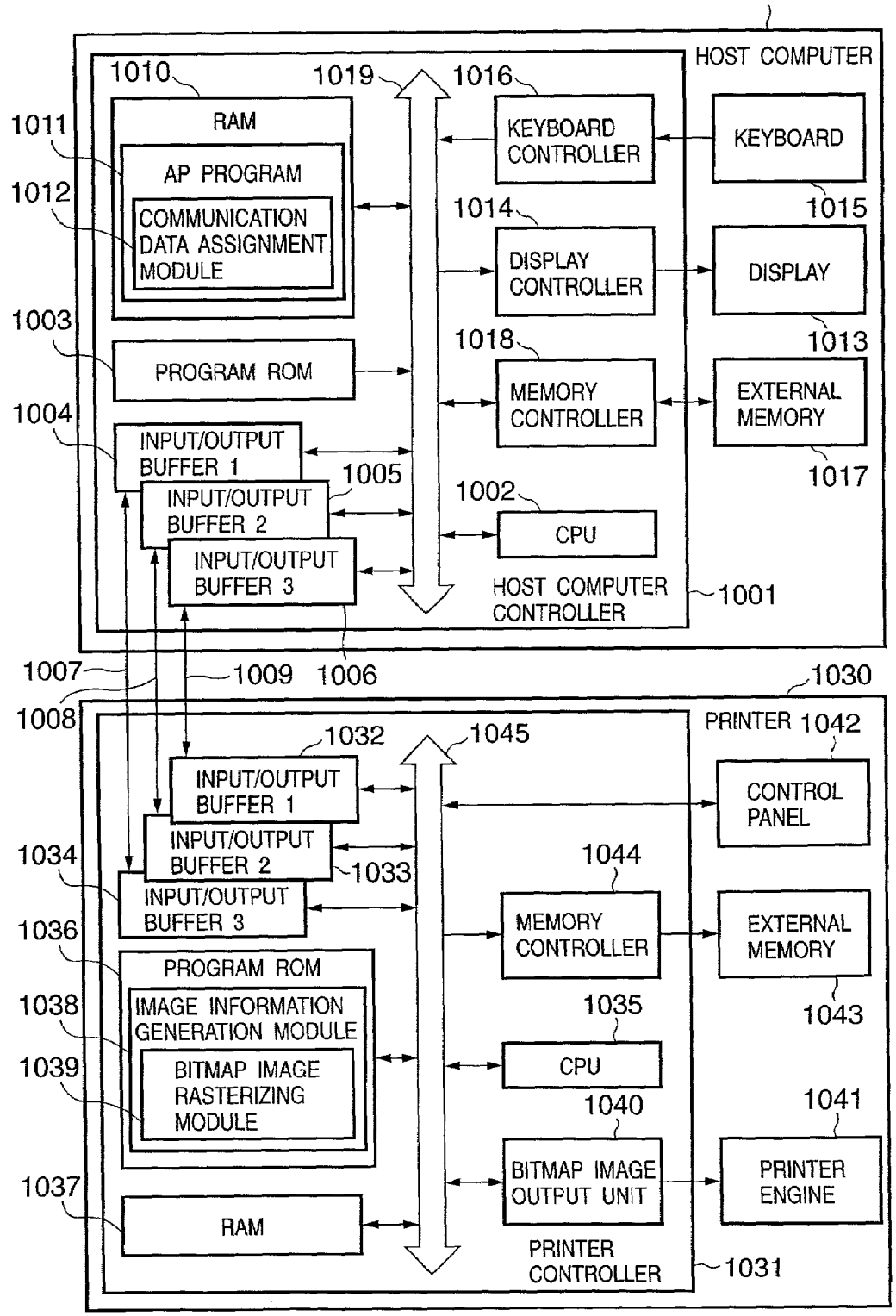
FIG. 2 is a block diagram for explaining the arrangement of a printer system according to an embodiment of the present invention.

FIG. 2 shows the arrangement of a print system to which the present invention is applied, and which comprises a host computer 1000 and printer 1030. In the host computer 1000 that uses the printer, a controller 1001 is a host computer controller that controls the operation of the host computer. The controller 1001 comprises a CPU 1002 for controlling the operation of the overall host computer, a program ROM 1003 which stores programs that describe the operations of the CPU, input/output buffers 1004, 1005, and 1006 respectively for communication means 1007, 1008, and 1009 which exchange control codes and data with the printer 1030, a RAM 1010 which stores the control codes, and is used as a work memory for computations required upon interpreting and printing data, and for print data processes, a display 1013 for presenting an image processed by the computer to the user, a display controller 1014 for controlling the display 1013, a keyboard 1015 used to accept user's commands, a keyboard controller 1016 for controlling the keyboard 1015, an external memory 1017 used to save print data, various kinds of information of the host computer, and the like, a memory controller 1018 for controlling the external memory 1017, and a system bus 1019 for connecting the respective units. The RAM 1010 also stores an application program (AP program) 1011 as application software which runs on the host computer 1000 and a program for describing the operations of drivers and the like, a program for implementing a communication data assignment module 1012 for assigning and scheduling data to be printed to the respective communication means upon printing, and the like.

The printer 1030 has a control unit 1031 for generating image data, and controlling the overall apparatus, a printer engine 1041 for printing image data generated by the control unit 1031 on a medium such as a paper sheet or the like, a control panel 1042 on which the user makes operations such as setups and the like, and an external memory 1043 which stores print data and various kinds of information of the printing apparatus including font data, form data, data and control codes received from the host, and the like, and also stores image data and the like generated based on print data. The external memory often stores a program which is loaded onto a RAM 1037 and is executed by a CPU 1035.

The control unit 1031 is a printer control unit for controlling the operation of the printer. The control unit 1031 has input/output buffers 1032, 1033, and 1034 respectively for the communication means 1007, 1008, and 1009 for exchanging control codes and data with the host computer 1000, the CPU 1035 for controlling the operation of the overall printer, a program ROM 1036 which stores programs that describe the operations of the CPU 1035, the RAM 1037 which is used as a work memory upon computations required for interpreting and printing control codes and data, or for a print data process, a bitmap image transfer (output) unit 1040 for transferring a bitmap image that has been rasterized to an image to the printer engine, a memory controller 1044 for controlling the external memory 1043, and a system bus 1045 for connecting the respective units.

Note that the ROM 1036 stores a program for implementing an image information generation module 1038 for generating various image objects on the basis of data received from the host computer, a program for implementing a bitmap image rasterizing module 1039 for generating bitmap data as image information, and the like.

<Arrangement of Print System (FIG. 3)>

Figure 3:
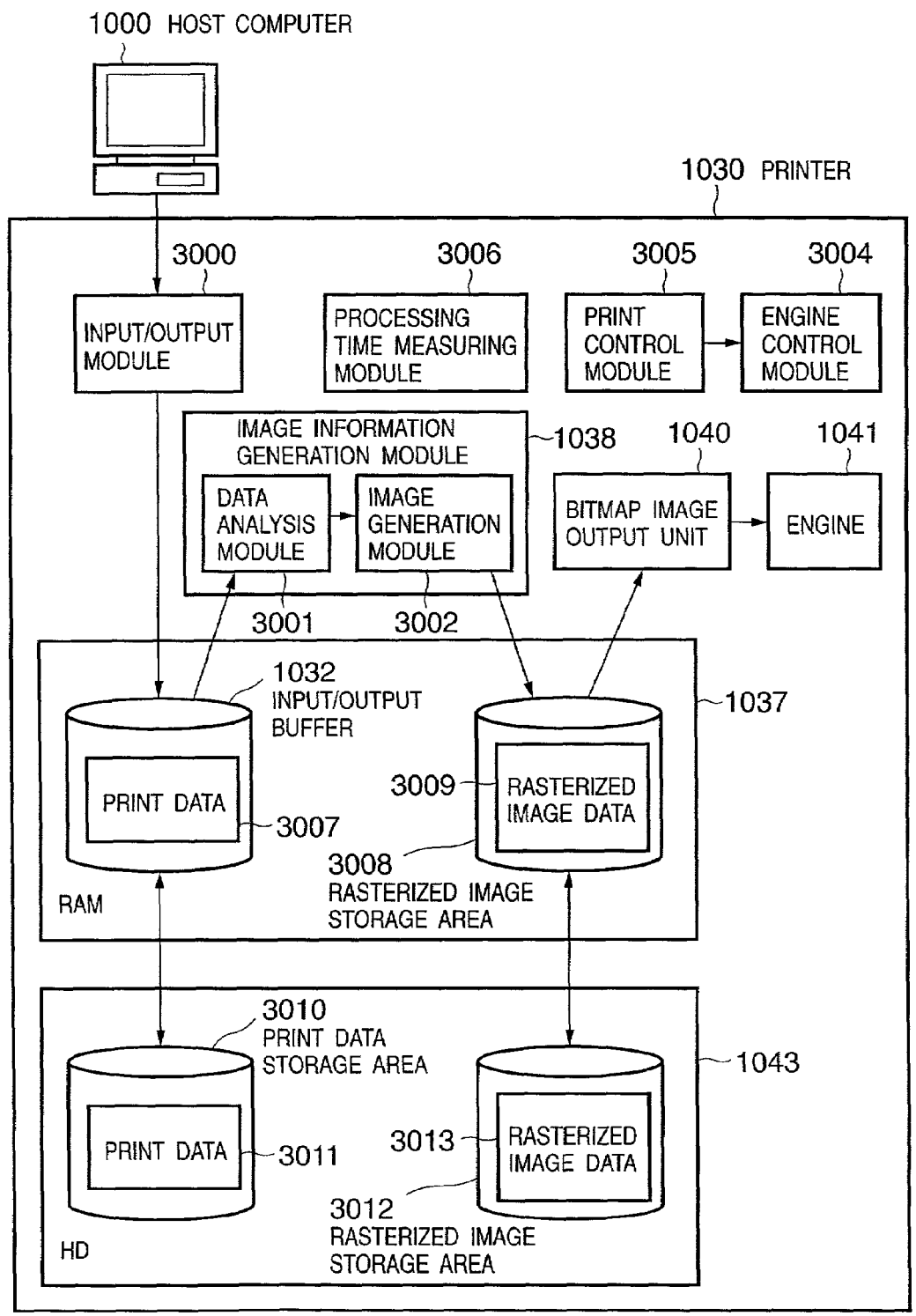
FIG. 3 is a block diagram for explaining the logical structure of a printer according to the first embodiment of the present invention.

FIG. 3 is a block diagram showing the logical structure of the print system to which the present invention is applied. The same reference numerals in FIG. 3 denote the same blocks as those in FIG. 2.

Print data sent from the host computer 1000 is stored in the input/output buffer 1032 via an input/output unit 3000. The printer of this embodiment has a plurality of input/output buffers, and input/output buffer 1 (1032) is used as an example.

When input of print data starts, the input/output module 3000 informs a print control module 3005 of the start of input. The print control module 3005 controls the overall operation that pertains to a print process, and has a role of issuing instructions to respective modules. Upon receiving the input start message of print data from the input/output module 3000, the print control module 3005 instructs a data analysis module 3001 to start data analysis.

Upon receiving the data analysis start instruction, the data analysis module 3001 reads out the print data from the input/output buffer 1032, analyzes the readout data, and sends an instruction to an image generation module 3002 in accordance with the analysis result to control it to generate rasterized image data 3009 (rasterized object) such as bitmap data or the like. The generated image data is stored in a rasterized image storage area 3008 assured on the RAM 1037. Upon completion of generation of a rasterized image for one page by the image generation module 3002, the data analysis module 3001 informs the print control module 3005 of completion of generation of rasterized image data for one page.

Upon receiving the message indicating that the rasterized image for one page is generated, the print control module 3005 instructs the bitmap image output unit 1040 to output a video signal. Upon receiving a re-print command of rasterized image data that has already been generated and saved, the print control module 3005 instructs the bitmap image output unit 1040 to output a video signal.

Upon receiving the video output instruction, the bitmap image transfer unit 1040 reads out the rasterized image data 3009 from the area 3008, converts the readout data into a video signal, and transfers the video signal to the engine 1041. The engine 1041 receives the video signal, prints an image, and exhausts a paper sheet.

A processing time measuring module 3006 measures the processing times of the data analysis module 3001 and bitmap image output unit 1040.

Upon printing a plurality of copies, two different methods are available, as described above. In the first method, print data 3007 for one job is stored in the input/output buffer 1032, a process for reading out the print data 3007 from the input/output buffer 1032, and generating and outputting an image is executed for each copy, and that process is repeated in correspondence with the number of copies to be printed. In the second method, rasterized image data for one job is stored in the rasterized image storage area 3008, a process for reading out and outputting image data from the rasterized image storage area 3008 is executed for each copy, and that process is repeated in correspondence with the number of copies to be printed.

A print data storage area 3010 is assured on the hard disk (HD) 1043. Also, a rasterized image data storage area 3012 is assured on the HD. Furthermore, the rasterized image data storage area 3012 is used as a save area when the input buffer 1032 or the rasterized image data storage area 3008 on the RAM 1037 have become full of data. When the print process is done by the first method, since large-size print data is stored in the input/output buffer 1032, most of print data is stored in the area 3011 assured on the hard disk 1043. When the print process is done by the second method, since large-size image data is generated, most of the image data is stored in the area 3012 assured on the hard disk 1043.

Figure 4:
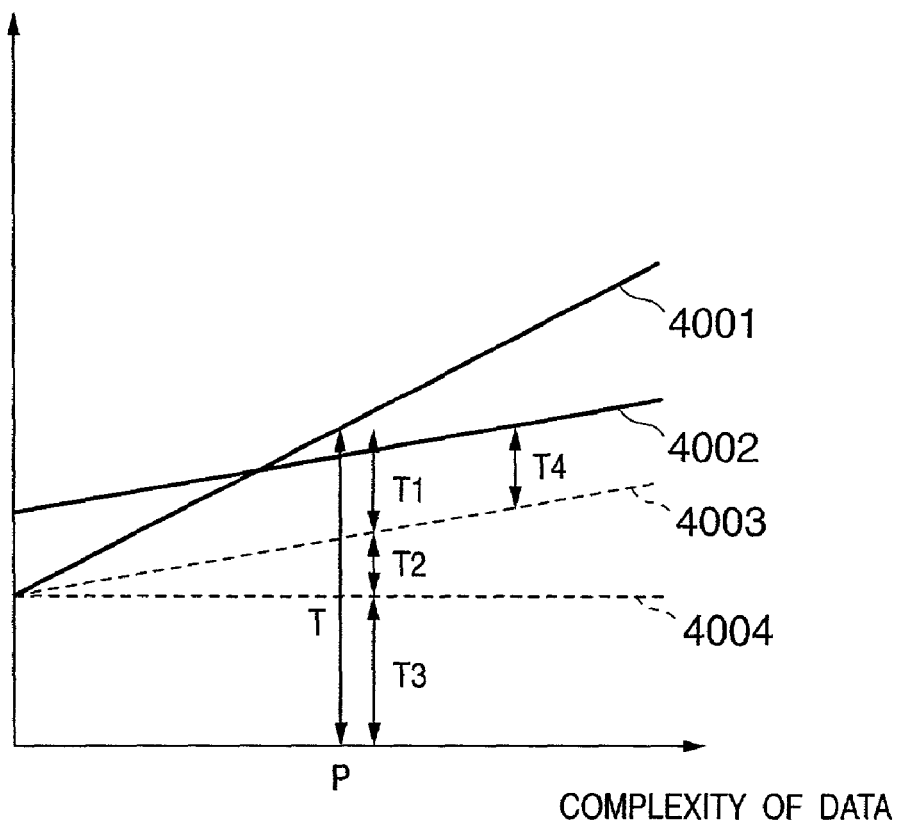
FIG. 4 is a graph showing an example of different processing times depending on data.

FIG. 4 is a graph for explaining the processing time difference between the first and second methods. FIG. 4 shows a method of printing only one copy by the first and second methods, and estimating the times required upon printing the second and subsequent copies. Respective lines in FIG. 4 indicate the print processing times per copy having the complexity of data as a parameter. The time required for printing the first copy is different from that shown in FIG. 4 since time measurement for estimating the print time is done in the sequence to be described later. The times required for printing the first copy need not be compared since both the first and second methods require the same time if the same data is to be printed.

Referring to FIG. 4, a broken line 4004 indicates a processing time other than the analysis process and print process, i.e., a time required for a process commonly executed irrespective of the method, and this time is theoretically constant (T3) independently of the method.

A broken line 4003 indicates a time as the sum of the constant time T3 indicated by the broken line 4004 and a print time required for outputting image data to the engine. This time increases with increasing complexity of data since grayscale data requires, e.g., a pseudo halftone process. In this way, the time indicated by the broken line 4003 is required even when either of the first and second methods is used in the print process. Hence, the time indicated by the broken line 4003 will be referred to as a common time.

A straight line 4001 indicates a time as the sum of the common time indicated by the broken line 4003 and an analysis processing time which is unique to the first method, and is required for analyzing input data and generating image data. Since the analysis processing time increases with increasing the number of objects, increasing the number of density levels, and increasing complexity of an image, the slope of the straight line 4001 is larger than that of the broken line 4003.

A straight line 4002 indicates a time as the sum of the common time indicated by the broken line 4003 and a read-out time T4 required for reading out stored image data. Image data is normally stored in a hard disk or the like, and the time T4 required for reading out data is nearly constant irrespective of complexity of data. For this reason, the slope of the straight line 4002 matches that of the broken line 4003.

In this manner, in the first embodiment, since the analysis process is repeated, the analysis processing time becomes short if data is simple, and it becomes longer as data is more complicated. In the second method, when an image is compressed/expanded, an image is complicated as data is more complicated, and the compression ratio increases and the time required for compression/expansion lowers if data is compressed. However, FIG. 4 does not include this compression/expansion time. If the compression/expansion time is included, the slope of the straight line 4002 becomes somewhat larger than FIG. 4.

The straight lines 4001 and 4002 cross at a point of certain complexity of data, and the processing times of the first and second methods are reversed at that point. In this embodiment, the processing times of the respective methods are actually measured upon printing the first copy, and a method that requires a shorter processing time is selected to determine the print method for the second and subsequent copies.

Assume that data with complexity P is to be printed. In this case, a processing time T by the first method is given by analysis processing time T1+ print time T2+common time T3 from FIG. 4. On the other hand, a processing time by the second method is given by read-out time T4+print time T2+common time T3. That is, the processing time difference of the first and second methods is given by T1−T4. If T1 becomes larger than T4, the second method has a shorter processing time; if T1 becomes smaller than T4, the first method has a shorter processing time.

By measuring and comparing the analysis processing time T1 and the read-out time T4, a suitable method can be determined.

Figure 5:
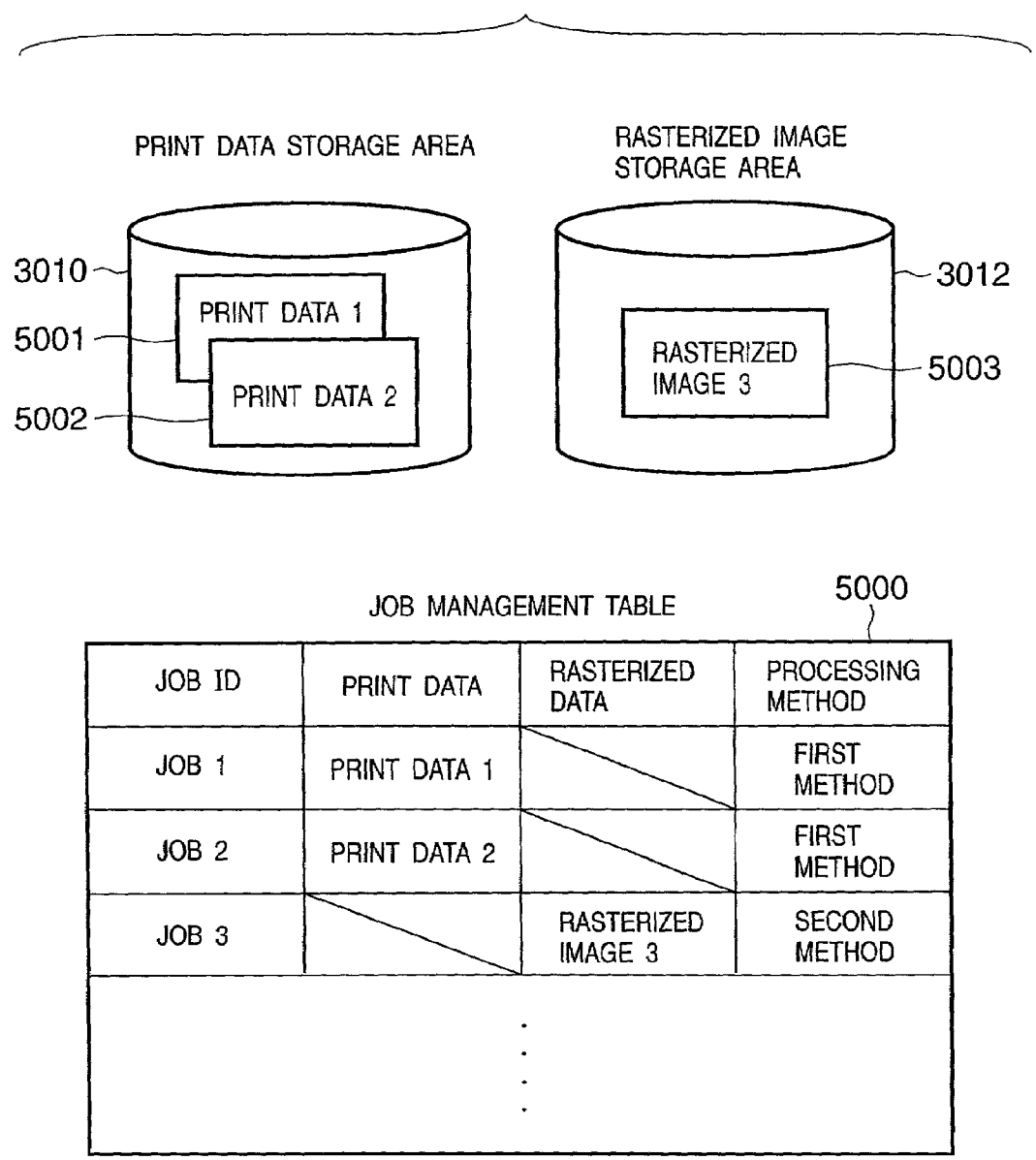
FIG. 5 shows the structure of a job management table of a printer according to an embodiment of the present invention.

FIG. 5 is a view for explaining the structure of a job management table. A job management table 5000 is held in the RAM 1037 or hard disk 1043. The job management table 5000 stores information of print data storage locations, rasterized image data storage locations, and selected processing methods for respective jobs.

In this embodiment, when the first method is selected, print data is held after the first copy is printed; when the second method is selected, rasterized image data is held after the first copy is printed. Before the processing method is determined, both data are held.

In the example shown in FIG. 5, for job 1, the first processing method is selected and print data 1 (5001) is held in the area 3010. For job 2, the first processing method is selected and print data 2 (5002) is held in the area 3010. For job 3, the second processing method is selected and rasterized image data 3 (5003) is held in the area 3012. Note that the rasterized image data (5003) is stored after it is compressed. The processing method for each job is selected in the sequences shown in FIGS. 6 and 7.

<Selection of Print Method and Print Process>

Figure 6:
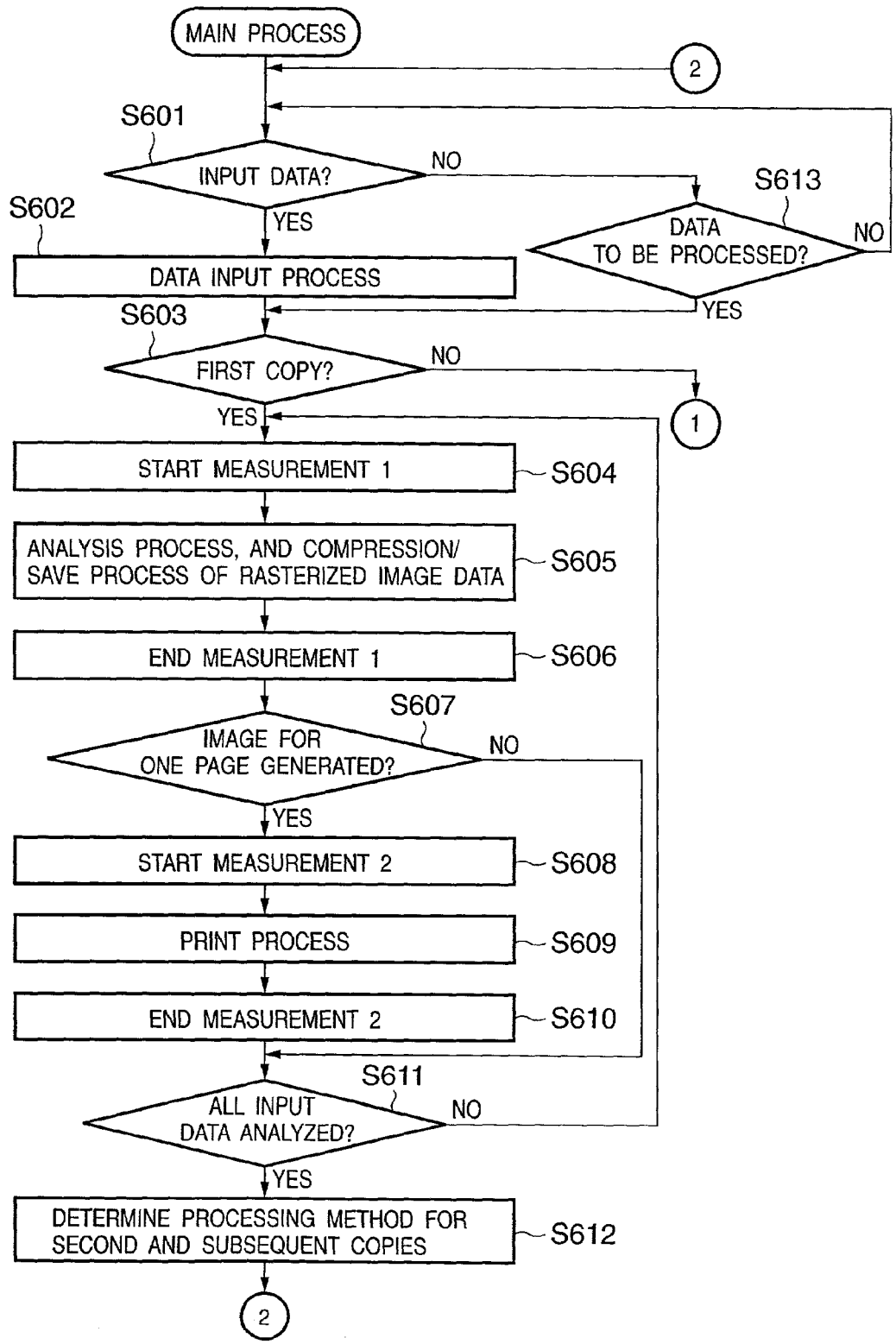
FIG. 6 is a flow chart of a main process in the first embodiment.

The flow of the process of the printing apparatus of this embodiment will be described below. FIG. 6 is a flow chart showing a main process of the printing apparatus of this embodiment. The sequence shown in FIG. 6 is implemented when the CPU 1035 executes a program stored in the RAM, ROM, or hard disk in FIG. 2. On the other hand, the sequence is implemented by the print control module 3005 in FIG. 3.

Referring to FIG. 6, step 601 is an input data waiting loop. If a print job of a multi-copy print process begins to be input from the host, the flow advances to step 602 to execute a data input process. If no data is input, it is checked in step 613 if data or a process to be processed (e.g., the print process of the second and subsequent copies or the like) still remains. If YES in step 613, the flow advances to step 603. The processes in steps 601, 602, and 613 are executed as tasks independent from those in step 603 and subsequent steps to be asynchronous thereto. However, FIG. 6 shows these steps together for the sake of simplicity since the data input procedure must be explained together.

After data input, the presence/absence of designation of a multi-copy print process can be checked based on information appended to, e.g., a header field of the print job. In such case, the presence/absence of designation of a multi-copy print process is checked after the data input process. If such designation is not found, a normal single-copy print process is executed.

It is checked in step 603 if the first copy is to be printed. If YES in step 603, the flow advances to step 604; otherwise, the flow advances to multi-copy print process step 701. The multi-copy print process will be described later with reference to FIG. 7.

In step 604, the analysis processing time T1 for one copy begins to be measured (measurement 1). In step 605, an analysis process is executed. In step 606, measurement 1 is completed, and the measurement result is saved. Since the analysis process is repeated during one job, an accumulated time of the analysis times is computed. It is checked in step 607 if generation of rasterized image data for one page is complete. If the rasterized image data for one page has been generated, the print process in step 608 and subsequent steps is executed. If the rasterized image data for one page has not been generated yet, the flow jumps to step 611.

In step 608, the read-out time T4 of the rasterized data from the hard disk begins to be measured (measurement 2). In step 609, the rasterized image data generated and compressed/saved in step 605 is read out, and undergoes a print process after expansion. In the print process, the rasterized image data is read out, and is converted into a video signal. The video signal is then transferred to the engine, thus printing an image on an actual paper sheet. In step 610, measurement 2 is completed. Since the print process is often repeated during one job, its accumulated time is computed.

It is checked in step 611 if all input data of the job to be processed are analyzed. If YES in step 611, the flow advances to step 612 to determine the processing method for the second and subsequent copies.

In step 612, the processing method for the second and subsequent copies is determined as follows.

(1) In case of a color print process, the first method is selected. Since image data is generated for each copy, a density correction function can effectively work when the apparatus has such function. In case of the color print process, since the first method is selected irrespective of the times measured in steps 604 to 606 and 608 to 610, steps 604, 606, 608, and 610 may be skipped not to measure the times T1 and T4.

(2) In case of a monochrome print process, a print method is determined on the basis of the times measured in steps 604 to 606 and 608 to 610. In this case, the following two different cases are available.

(2a) When the total analysis processing time T1 is smaller than the time T4 required for reading out rasterized image data, the first method for making analysis and image generation for each copy is selected. When these times are equal to each other, either method may be selected in terms of the print time. However, since color correction can be done for each copy, the first method is selected in this embodiment.

(2b) When the total analysis processing time T1 is larger than the time T4 required for reading out rasterized image data, the second method for printing using image data stored in the process for the first copy is selected.

In place of directly comparing the two measured times, a value obtained by multiplying one time by a predetermined coefficient may be compared with the other time.

When the print method for the second and subsequent copies is determined, the flow returns to step 601, and if input data is detected, its input process is executed. If data to be processed remains, it is processed.

Figure 7:
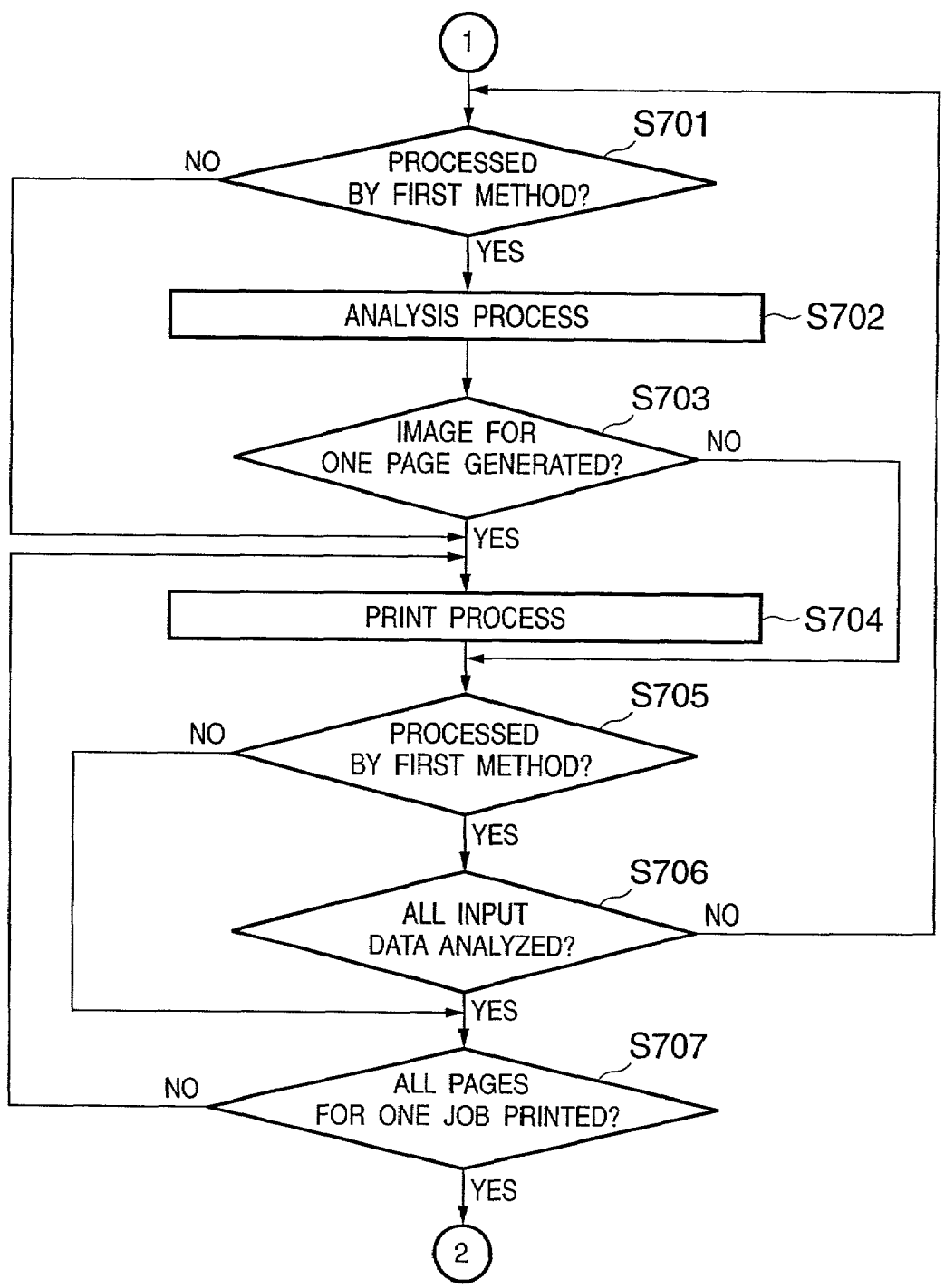
FIG. 7 is a flow chart of a multi-copy print process in the first embodiment.

FIG. 7 is a flow chart showing the process for the second and subsequent copies in the multi-copy print process. It is checked in step 701 if the first or second method is selected as the processing method. The processing method has already been determined in step 602 before the control reaches this step. If the first method is selected, the flow advances to step 702; if the second method is selected, the flow jumps to step 704.

In step 702, data is read out from the input data storage area 3010, and undergoes an analysis process. It is checked in step 703 if an image for one page is generated. If YES in step 703, the flow advances to step 704 to execute a print process. Note that the print process in step 704 is executed based on image data 3009 read out from the image storage area 3008 if the first method is selected; it is executed based on image data 3013 read out from the image storage area 3012 if the second method is selected. If an image for one page is not generated yet, the flow jumps to step 705.

It is checked in step 705 if the selected processing method is the first or second method. If the selected method is the first method, the flow advances to step 706. On the other hand, if the selected method is the second method, the flow jumps to step 707. It is checked in step 706 if all input data of the job to be processed have been analyzed. If YES in step 706, the flow advances to step 707; otherwise, the flow returns to step 701.

It is checked in step 707 if all pages for one copy have been printed. If YES in step 707, the flow returns to step 601 in FIG. 6, and if copies to be printed still remain, they are output. If NO in step 707, the flow returns to step 704 to print one page.

In this manner, in the print process for the second and subsequent copies, if the first method is selected, print data is analyzed by the loop formed by steps 701, 702, 703, 705, and 706, and every time image data for one page is generated, it is printed in step 704. On the other hand, if the second method is selected, the stored image data is printed by the loop formed by steps 704, 705, and 707.

As described above, upon receiving a print job of a multi-copy print process, the analysis processing time and read-out time of generated image data are measured upon printing the first copy, and a method that can print the second and subsequent copies more quicker is selected as the print method for it in accordance with the measured times. As a result, even when the user does not designate, a method that can exhibit the best performance in correspondence with the data contents can be selected, and the print process can be done based on that method.

In case of a color print process, since the first method is selected, and rasterized image data is generated from print data for each copy, if an engine having a density correction function is used, image data corresponding to a change in engine state can be generated by effectively using the density correction function, and a change in chromaticness during printing a plurality of copies can be prevented.

In this embodiment, the processing method is selected for each job, but may be selected for each page.

Only the RAM may be used as the memory without using the hard disk.

In addition to a print job that immediately prints a plurality of copies after input, when input print data or generated rasterized image data are held without being printed, and print processes of a plurality of copies start in accordance with a command or an instruction on the panel, this embodiment can be applied.

[Second Embodiment]

As the second embodiment, a print system which further has a fixed mode that allows the user or the like to designate the first or second method described in the first embodiment, and a function that allows the host computer to set a density correction value will be explained. This embodiment is different from the first embodiment that even when data to be printed is color data, the first method is not selected for that reason, in addition to these added functions. In the following description, the same reference numerals used in the description of the first embodiment denote the building components and steps which are the same as those of the print system of the first embodiment.

<System Arrangement>

Figure 8:
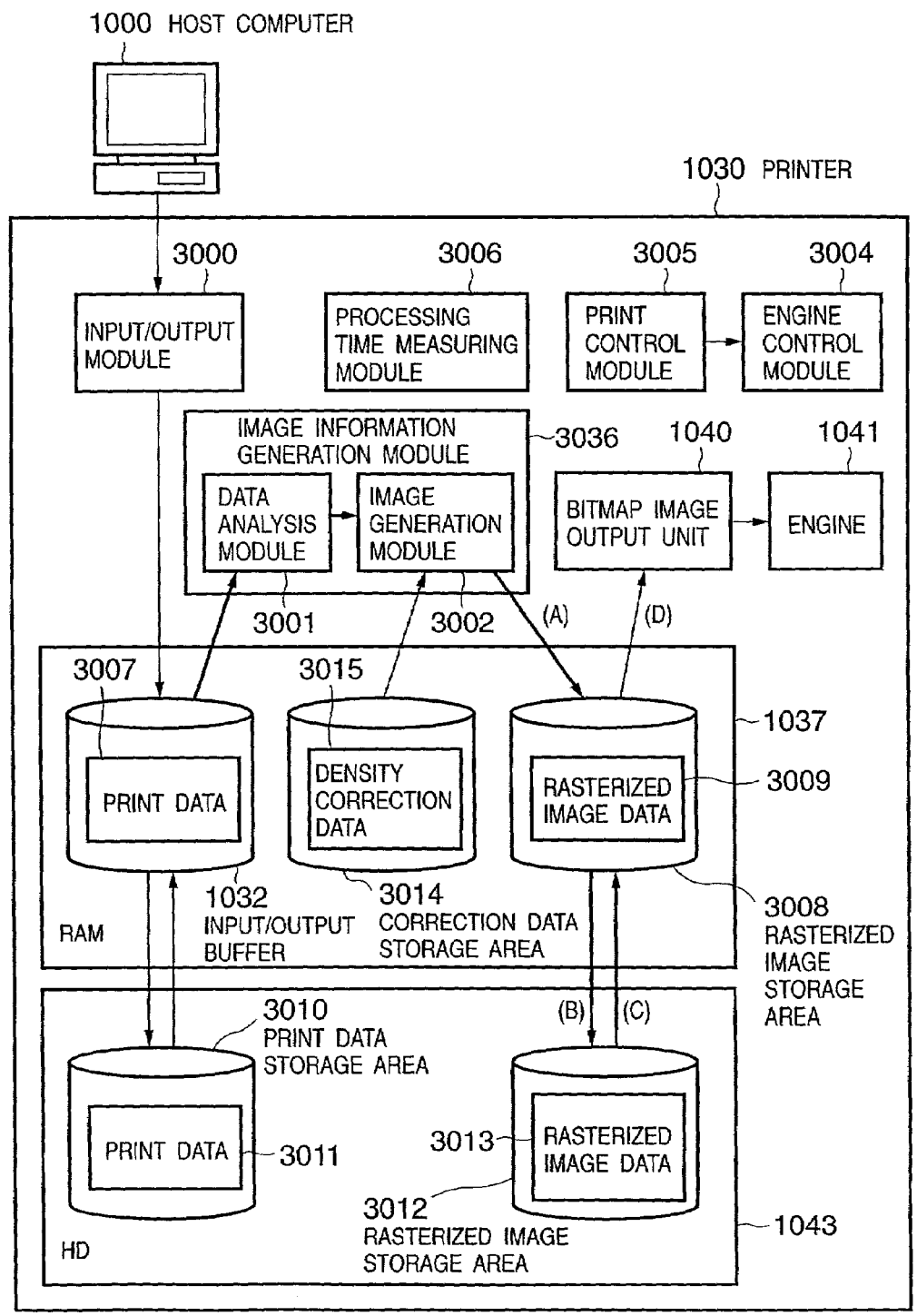
FIG. 8 is a block diagram for explaining the logical structure of a printer according to the second embodiment of the present invention.

FIG. 8 is a block diagram showing the logical structure of a print system to which the present invention is applied in the second embodiment.

Print data sent from the host computer 1000 is stored in the input/output buffer 1032 via the input/output module 3000. The printer of this embodiment has a plurality of input/output buffers, and input/output buffer 1 (1032) is used as an example.

When input of print data starts, the input/output module 3000 informs the print control module 3005 of the start of input. The print control module 3005 controls the overall operation that pertains to a print process, and has a role of issuing instructions to respective modules. Upon receiving the input start message of print data from the input/output module 3000, the print control module 3005 instructs the data analysis module 3001 to start data analysis.

Upon receiving the data analysis start instruction, the data analysis module 3001 reads out the print data from the input/output buffer 1032, analyzes the readout data, and sends an instruction to the image generation module 3002 in accordance with the analysis result to control it to generate rasterized image data 3009 (rasterized object) such as bitmap data or the like. In this case, upon receiving a density correction instruction, the image generation module 3002 corrects the density of an image using density correction data 3015 stored in a correction data storage area 3014. The density correction instruction may be received from the host computer 1000 together with print data, or may be received independently of print data. Although not shown, a printer itself may comprise a scanner like a copying machine, facsimile, or hybrid function machine. Such printer can generate density correction data without the intervention of a host computer. For example, a sample image is printed out, and the printed-out image is scanned by its scanner. By comparing color data of the sample image and those scanned by the scanner, density correction data is generated. In this case, color correction of the scanner must be correctly done.

The generated image data is stored in the rasterized image storage area 3008 assured on the RAM 1037. Upon completion of generation of a rasterized image for one page by the image generation module 3002, the data analysis module 3001 informs the print control module 3005 of completion of generation of rasterized image data for one page.

Upon receiving the message indicating that the rasterized image for one page is generated, the print control module 3005 instructs the bitmap image output unit 1040 to output a video signal. Upon receiving a re-print command of rasterized image data that has already been generated and saved, the print control module 3005 instructs the bitmap image output unit 1040 to output a video signal.

Upon receiving the video output instruction, the bitmap image transfer unit 1040 reads out the rasterized image data 3009 from the area 3008, converts the readout data into a video signal, and transfers the video signal to the engine 1041. The engine 1041 receives the video signal, prints an image, and exhausts a paper sheet.

The processing time measuring module 3006 measures the processing times of the data analysis module 3001 and bitmap image output unit 1040.

Upon printing a plurality of copies, two different methods are available, as described above. In the first method, print data 3007 for one job is stored in the input/output buffer 1032, a process for reading out the print data 3007 from the input/output buffer 1032, and generating and outputting an image is executed for each copy, and that process is repeated in correspondence with the number of copies to be printed. In the second method, rasterized image data for one job is stored in the rasterized image storage area 3008, a process for reading out and outputting image data from the rasterized image storage area 3008 is executed for each copy, and that process is repeated in correspondence with the number of copies to be printed.

The print data storage area 3010 is assured on the hard disk (HD) 1043. Also, the rasterized image data storage area 3012 is assured on the HD. Furthermore, the rasterized image data storage area 3012 is used as a save area when the input buffer 1032 or the rasterized image data storage area 3008 on the RAM 1037 have become full of data. When the print process is done by the first method, since large-size print data is stored in the input/output buffer 1032, most of print data is stored in the area 3011 assured on the hard disk 1043. When the print process is done by the second method, since large-size image data is generated, most of the image data is stored in the area 3012 assured on the hard disk 1043.

<Selection of Print Method and Print Process>

The flow of the process of the printing apparatus of this embodiment will be described below.

Figure 9:
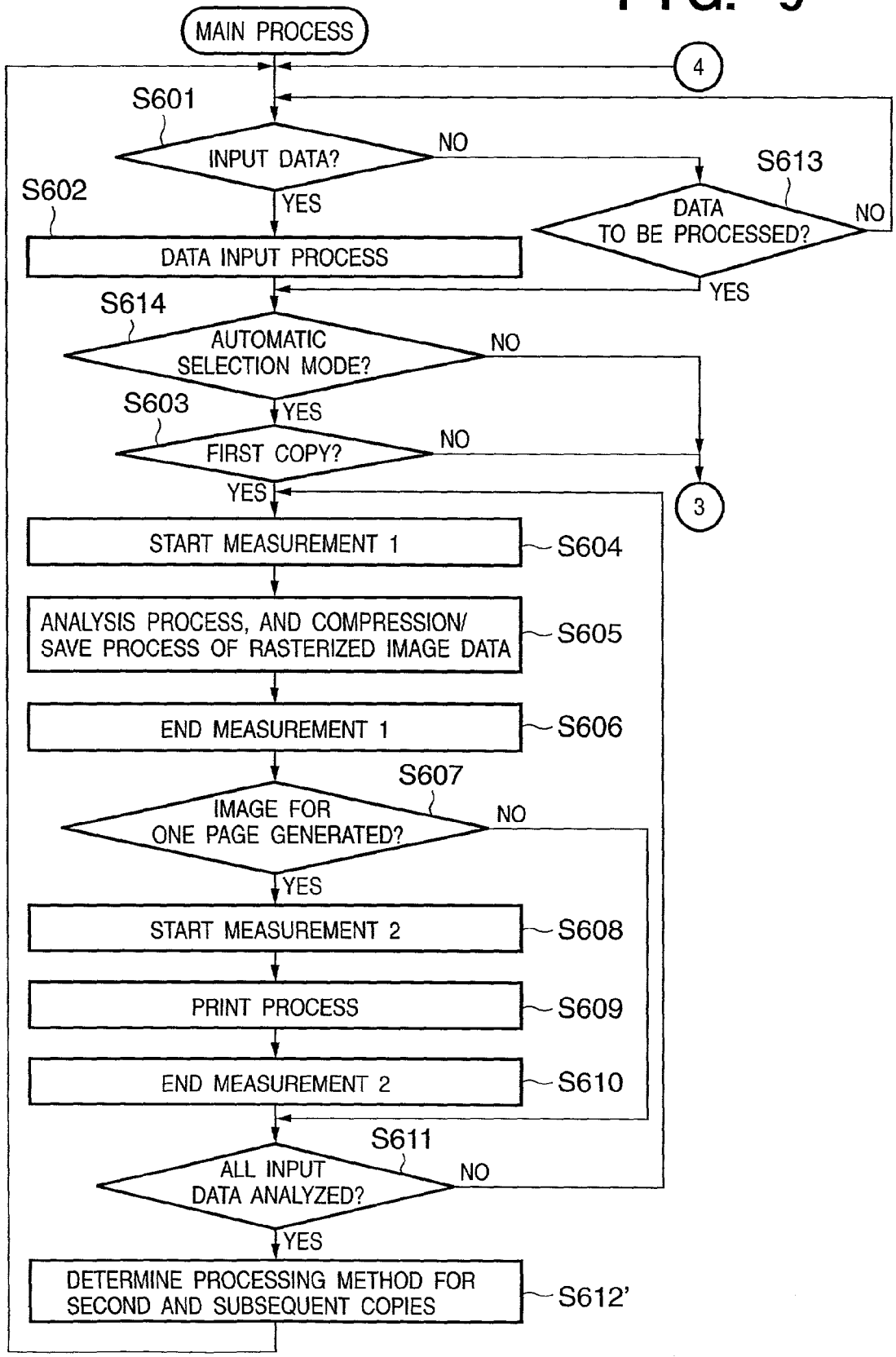
FIG. 9 is a flow chart showing a main process in the second embodiment.

FIG. 9 is a flow chart showing a main process of the printing apparatus of this embodiment. Referring to FIG. 9, step 601 is an input data waiting loop. If a print job of a multi-copy print process begins to be input from the host, the flow advances to step 602 to execute a data input process. If no data is input, it is checked in step 613 if data or a process to be processed (e.g., the print process of the second and subsequent copies or the like) still remains. If YES in step 613, the flow advances to step 614. The processes in steps 601, 602, and 613 are executed as tasks independent from those in step 614 and subsequent steps to be asynchronous thereto. However, FIG. 9 shows these steps together for the sake of simplicity since the data input procedure must be explained together.

After data input, the presence/absence of designation of a multi-copy print process can be checked based on information appended to, e.g., a header field of the print job. In such case, the presence/absence of designation of a multi-copy print process is checked after the data input process. If such designation is not found, a normal single-copy print process is executed.

In step 614, the current mode is checked. The mode includes an automatic selection mode for automatically selecting one of the first and second methods having a shorter processing time upon executing a print process, and a fixed mode that allows to designate one of the first and second methods. The mode is selected by panel operation on the printer 1030 or a command from the host computer 1000. If the fixed mode and the first method are selected, the flow advances to step 701; if the fixed mode and the second method are selected, or if the automatic selection mode is selected, the flow advances to step 603.

In the second method, since image data that has been corrected by density correction information obtained by the engine is held, the density state of the printer engine may change while many copies are printed, and the first and last copy may have different tinctures. In such case, the first method is preferably designated in the fixed mode. When a speed-priority process is to be done, the automatic selection mode is preferably selected.

It is checked in step 603 if the first copy is to be printed. If YES in step 603, the flow advances to step 604; otherwise, the flow advances to multi-copy print process step 701. The multi-copy print process will be described later with reference to FIG. 10.

In step 604, the analysis processing time T1 for one copy begins to be measured (measurement 1). In step 605, an analysis process is executed. In step 606, measurement 1 is completed, and the measurement result is saved. Since the analysis process is repeated during one job, an accumulated time of the analysis times is computed. It is checked in step 607 if generation of rasterized image data for one page is complete. If the rasterized image data for one page has been generated, the print process in step 608 and subsequent steps is executed. If the rasterized image data for one page has not been generated yet, the flow jumps to step 611.

In step 608, the read-out time T4 of the rasterized data from the hard disk begins to be measured (measurement 2). In step 609, the rasterized image data generated and compressed/saved in step 605 is read out, and undergoes a print process after expansion. In the print process, the rasterized image data is read out, and is converted into a video signal. The video signal is then transferred to the engine, thus printing an image on an actual paper sheet. In step 610, measurement 2 is completed. Since the print process is often repeated during one job, its accumulated time is computed.

It is checked in step 611 if all input data of the job to be processed are analyzed. If YES in step 611, the flow advances to step 612' to determine the processing method for the second and subsequent copies.

Step 612' is executed only when it is determined in step 614 that the automatic selection mode is selected. In step 612', the processing method for the second and subsequent copies is determined as follows.

(1) A print method is determined on the basis of the times measured in steps 604 to 606 and 608 to 610. In this case, the following two different cases are available.

(1a) When the total analysis processing time T1 is smaller than the time T4 required for reading out rasterized image data, the first method for making analysis and image generation for each copy is selected. When these times are equal to each other, either method may be selected in terms of the print time. However, since color correction can be done for each copy, the first method is selected in this embodiment.

(1b) When the total analysis processing time T1 is larger than the time T4 required for reading out rasterized image data, the second method for printing using image data stored in the process for the first copy is selected.

In place of directly comparing the two measured times, a value obtained by multiplying one time by a predetermined coefficient may be compared with the other time.

When the print method for the second and subsequent copies is determined, the flow returns to step 601, and if input data is detected, its input process is executed. If data to be processed remains, it is processed.

Figure 10:
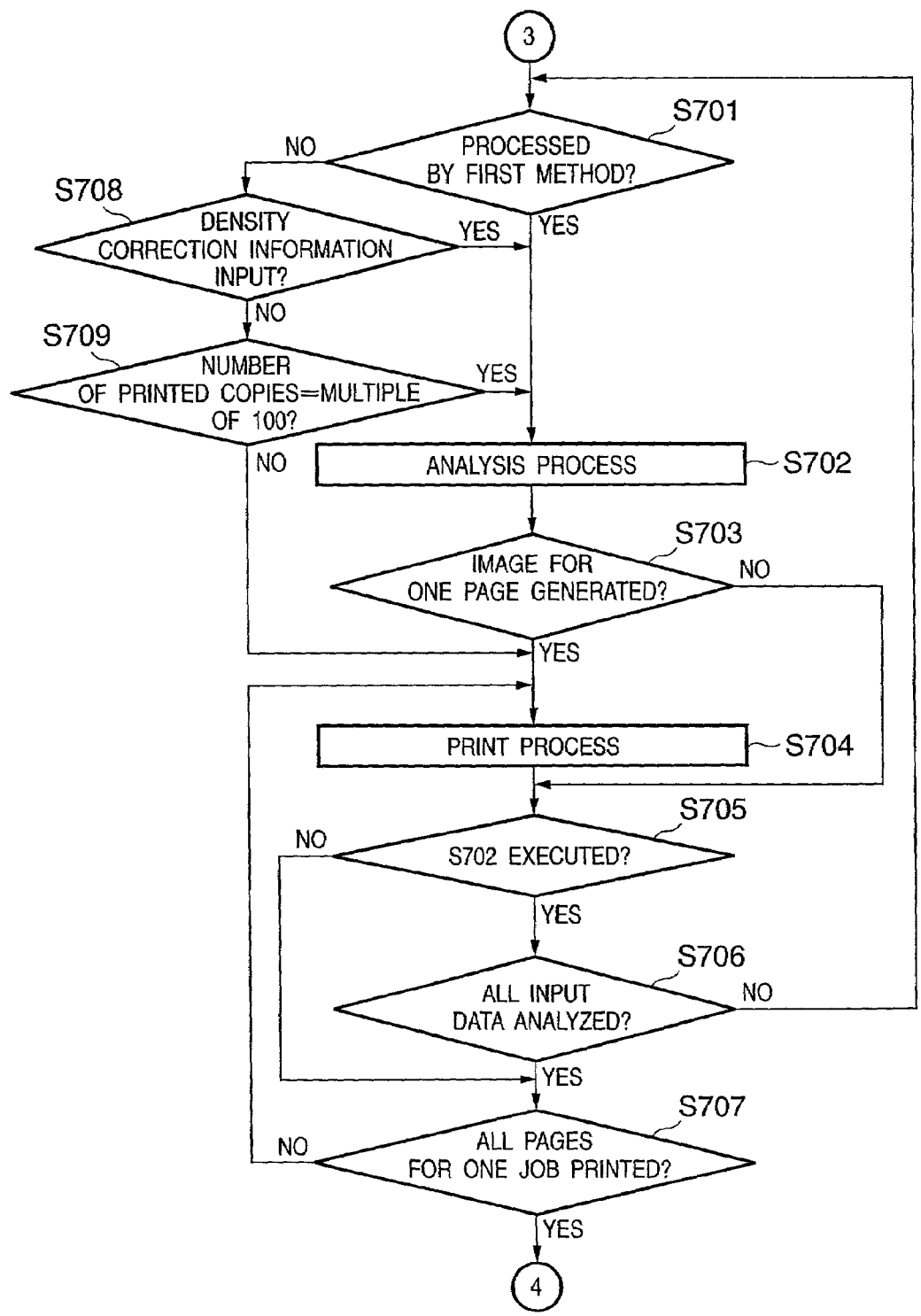
FIG. 10 is a flow chart of a multi-copy print process in the second embodiment.

FIG. 10 is a flow chart showing the process for the second and subsequent copies in the multi-copy print process. It is checked in step 701 if the first or second method is selected as the processing method. The processing method has already been determined in step 602 before the control reaches this step. If the first method is selected, the flow advances to step 702; if the second method is selected, the flow advances to step 708.

In step 702, data is read out from the input data storage area 3010, and undergoes an analysis process and image generation process. If the first method is selected, image data is not saved in the hard disk. If the second method is selected, image data is saved in the hard disk.

It is checked in step 708 if density correction information is input from the host computer. The printer of this embodiment can receive density correction information from the host computer in addition to that generated by an engine control module 3004. When density correction with higher precision than that by the engine control module 3004 is to be done, an actual print is scanned by a scanner, the difference from a sample print (the same picture) as a reference is measured to compute density correction information, and that information can be input to the printer. When density correction information is input, image data is generated again in accordance with the new density correction information even during the print process using the second method. In this embodiment, the scanner is connected to the host computer directly by an interface cable or via a network. Also, the same applies to a printer with a built-in scanner.

If it is determined in step 708 that the density correction information is input, the flow advances to step 702 to execute an analysis process and image generation process. On the other hand, if it is determined in step 708 that density correction information is not input, the flow advances to step 709.

It is checked in step 709 if the number of printed copies is a multiple of 100. If YES in step 709, the flow advances to step 702 to execute an analysis process (image generation process). In this case, assume that the multiple of 100 includes zero. For this reason, even when the first method is selected in the fixed mode, step 702 is executed upon printing the first copy. The checking process in step 709 is an example of generating an image at a predetermined timing even during processing by the second method so as to prevent image quality from deteriorating (different tinctures). Therefore, image generation may be redone under the condition that the number of printed sheets has reached a predetermined value or the elapsed time has reached a given time. In this case, a condition that guarantees execution of step 702 upon printing the first copy must be added.

On the other hand, the condition in step 709 may be limited to a color print process, since a change in tincture is conspicuous in the color print process.

On the other hand, if the number of printed copies is not a multiple of 100, the flow advances to step 704.

After step 702, it is checked in step 703 if an image for one page is generated. If YES in step 703, the flow advances to step 704 to execute a print process. Note that the print process in step 704 is executed based on image data 3009 read out from the image storage area 3008 if the first method is selected; it is executed based on image data 3013 read out from the image storage area 3012 if the second method is selected. If an image for one page is not generated yet, the flow jumps to step 705.

It is checked in step 705 if step 702 has been executed immediately before this step. If YES in step 705, the flow advances to step 706; otherwise, the flow jumps to step 707. Whether or not step 702 is executed can be checked in such a manner that a predetermined flag is set in step 702, is checked in step 705, and is reset after checking.

It is checked in step 706 if all input data of the job to be processed have been analyzed. If YES in step 706, the flow advances to step 707; otherwise, the flow returns to step 701.

It is checked in step 707 if all pages for one copy have been printed. If YES in step 707, the flow returns to step 601 in FIG. 9, and if copies to be printed still remain, they are output. If NO in step 707, the flow returns to step 704 to print one page.

In this manner, in the print process for the second and subsequent copies, if the first method is selected, print data is analyzed by the loop formed by steps 701, 702, 703, 705, and 706, and every time image data for one page is generated, it is printed in step 704.

On the other hand, if the second method is selected, the stored image data is printed in principle by the loop formed by steps 704, 705, and 707. However, when density correction information is input, the number of printed copies is a multiple of 100, and the first copy is to be printed, image data is generated by the loop formed by step 701, 708, (709), 702, 703, 705, and 706.

As described above, upon receiving a print job of a multi-copy print process, when the automatic selection mode is selected, the analysis processing time and read-out time of generated image data are measured upon printing the first copy, and a method that can print the second and subsequent copies more quicker is selected as the print method therefor in accordance with the measured times. As a result, even when the user does not designate, a method that can exhibit the best performance in correspondence with the data contents can be selected, and the print process can be done based on that method.

When the first method is selected in the fixed mode, the print process can be done a time corresponding to the storage and read-out processes of generated image data quicker than the first method selected in the automatic selection mode.

When the second method is selected in the fixed mode, if density information is input or a predetermined timing has been reached, image data is re-generated to execute designated color correction and to prevent the quality of an image to be formed from changing.

In this embodiment, the processing method is selected for each job, but may be selected for each page.

Only the RAM may be used as the memory without using the hard disk.

In addition to a print job that immediately prints a plurality of copies after input, when input print data or generated rasterized image data are held without being printed, and print processes of a plurality of copies start in accordance with a command or an instruction on the panel, this embodiment can be applied.

[Modification of Embodiment]

When print data is read out from the input buffer and is analyzed to generate image data, and the image data is stored in the image data storage unit to update the old data during a print data waiting time (idle time), a change in color of prints upon printing a plurality of copies can be prevented without increasing the processing time.

In addition to continuous print processes of a plurality of copies, the present invention can be similarly applied to a case wherein the second and subsequent copies are printed (so-called re-print) in response to a command or panel operation for a while after the first copy was printed. Also, the present invention can be similarly applied to a case wherein the analysis processing time T1 (the time required for analysis, which is measured in step 605) and read-out time T4 (the time required for reading out image data, which is measured in step 609) are stored in a nonvolatile memory together with print data and image data. In the re-print process, data may be stored without outputting any paper sheet for the first copy.

In the automatic selection process, when "analysis processing time T1<read-out time T4", i.e., when the accumulated time required for analysis is shorter than that required for storing and reading out image data, the first method is consequently selected. Even in such case, since the processing method is not determined yet upon printing the first copy, image data is saved and read out. For this reason, when the first method is selected in the automatic selection mode, the processing time is prolonged by the time required for saving and reading out image data for the first copy compared to that required when the first method is selected in the fixed mode.

To solve this problem, a minimum value of the time required for saving and reading out image data may be pre-stored, only the analysis processing time T1 may be measured for the first copy without saving and reading out image data, and the measured time may be compared with the minimum value of the read-out time T4. If the analysis processing time T1 is smaller than that minimum value, the first method may be selected; if the analysis processing time T1 is larger than the minimum value, the process of this embodiment may be executed from the second copy. The minimum value may be held as a fixed value, or may be set in the printer by panel operation or a command from the host. Also, the printer itself may statistically determine the minimum value.

Figure 11:
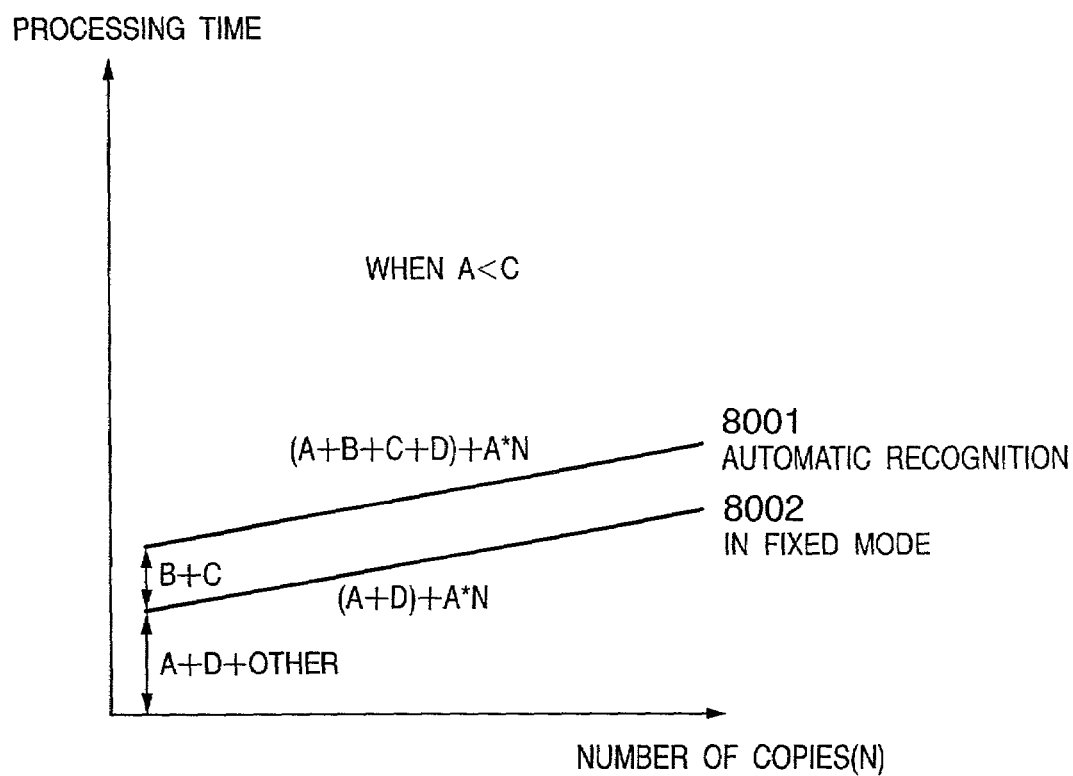
FIG. 11 is a graph for explaining different processing times when the first method is selected in an automatic select mode and when the first method is selected in a fixed mode in the second embodiment.

FIG. 11 is a graph for explaining the processing time difference between a case wherein the first method is selected in the automatic selection mode (straight line 8001), and a case wherein the first method is selected in the fixed mode (straight line 8002). The ordinate of the graph shown in FIG. 11 plots the processing time, and the abscissa plots the number (N) of copies to be printed. A, B, C, and D respectively represent the times required for processes (A, B, C, and D) in FIG. 8. That is, time A is an analysis processing time (corresponding to T1) required for generating image data from print data, time B is a time required for storing the generated image data in the hard disk, time C is a read-out time (corresponding to T4) required for reading out the image data from the hard disk, and time D is a time (corresponding to T2) required for outputting the image data in the RAM to the engine. Times A and D are required for each copy if the first method is selected. On the other hand, since times B and C are required only upon printing the first copy in the automatic selection mode, their time difference becomes the processing time difference between the two modes.

For this reason, when the processing method is determined in a simplified sequence by omitting the image data storage & read-out process upon processing the first copy, the print time can be further shortened.

As described above, in the automatic selection mode, upon receiving a print job of a multi-copy print process, the analysis processing time and read-out time of generated image data are measured upon printing the first copy, and a method that can print the second and subsequent copies more quicker is selected as the print method therefor in accordance with the measured times. As a result, even when the user does not designate, a method that can exhibit the best performance in correspondence with the data contents can be selected, and the print process can be done based on that method.

When the second method that stores generated image data, and prints a plurality of copies based on the stored image data is selected, since the image data is re-generated at a given timing, a change in chromaticness during printing a plurality of copies can be prevented. When a density correction instruction is made, that instruction is executed to reliably correct the density.

Also, when the processing method is determined in a simplified sequence by omitting the image data storage & read-out process upon processing the first copy, the print time can be further shortened.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

When the present invention is applied to the storage medium, that storage medium stores the program codes corresponding to the aforementioned flow charts (shown in FIGS. 6 and 7, and FIGS. 9 and 10).

To recapitulate, according to the present invention, a method suitable for the data contents can be selected, and the best performance of the printer can be exhibited.

In case of a color print process, in an engine having a density correction function, a change in tincture during printing of a plurality of copies can be prevented by selecting a suitable method.

The density correction function can be effectively used irrespective of the selected method.

Measurement of the processing time for determining the print method is simplified to select an optimal print method, and a delay of the process due to measurement can be suppressed.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus which has print means, and a multi-copy print function, comprising:
   first storage means for storing print data;
   image generation means for reading out the print data from said first storage means, and generating image data;
   second storage means for storing the image data;
   first measurement means for measuring a first time required for generating the image data by said image generation means;
   second measurement means for measuring a second time required for reading out the image data from said second storage means;
   comparison means for comparing the first and second times; and
   selection means for selecting as a print method a first method which prints based on the print data stored in said first storage means for each copy, and a second method that prints based on the image data stored in said second storage means for each copy, on the basis of the result of said comparison means,
   wherein said selection means always selects a predetermined one of the first and second methods irrespective of the result of said comparison means when the print data indicates a predetermined mode.

2. The apparatus according to claim 1, wherein said first and second measurement means measure the first and second times upon printing a first copy of a plurality of copies, and said selection means determines the print method for second and subsequent copies.

3. The apparatus according to claim 1, wherein said second storage means compresses and stores the image data.

4. The apparatus according to claim 1, wherein said print means is color print means having a density correction function, and when print data is color data, said selection means selects the first method irrespective of the result of said comparison means.

5. The apparatus according to claim 1, wherein said selection means selects the print method for each print page.

6. The apparatus according to claim 1, wherein when one of the first and second methods is designated as the print method, said selection means selects the designated method as the print method.

7. The apparatus according to claim 1, further comprising correction input means for externally inputting density correction data, and wherein when density correction data is externally input, said image generation means reads out the print data from said first storage means, generates the image data again in accordance with the input density correction data, and stores the generated image data in said second storage means irrespective of the print method selected.

8. The apparatus according to claim 7, further comprising means for reading an image printed on a paper sheet during a print process, and means for generating density correction data on the basis of the read image.

9. The apparatus according to claim 1, wherein when the second method is selected as the print method, said image generation means reads out the print data from said first storage means at a predetermined timing, analyzes the data to generate image data, and stores the generated image data in said second storage means to update old data.

10. The apparatus according to claim 1, further comprising re-print means for holding the print data of said first storage means, the image data of said second storage means, and the measurement results of said first and second measurement means, and printing in accordance with a re-print instruction.

11. The apparatus according to claim 1, further comprising means for reading out the print data from said first storage means during a print data waiting time, controlling said image generation means to analyze the data to generate image data, and storing the image data in said second storage means to update old data.

12. The apparatus according to claim 2, wherein a predetermined value is pre-stored as the second time, the first time and the predetermined value are compared without holding the image data upon printing the first copy, and said selection means selects as the print method the first method when the first time is smaller than the predetermined value or the second method when the first time is larger than the predetermined value.

13. A control method for a printing apparatus which has print means, and a multi-copy print function, comprising:
   a first storage step of storing print data in first storage means;
   an image generation step of reading out the print data from said first storage means, and generating image data;
   a second storage step of storing the image data in second storage means; a first measurement step of measuring a first time required for generating the image data in the image generation step;
   a second measurement step of measuring a second time required for reading out the image data from said second storage means;
   a comparison step of comparing the first and second times; and
   a selection step of selecting as a print method a first method which prints based on the print data stored in said first storage means for each copy, and a second method that prints based on the image data stored in said second storage means for each copy, on the basis of the result in the comparison step, wherein the selection step includes a step of always selecting a predetermined one of the first and second methods irrespective of the result in the comparison step when the print data indicates a predetermined mode.

14. The method according to claim 13, wherein the first and second measurement steps measure the first and second times upon printing a first copy of a plurality of copies, and the selection step includes the step of determining the print method for second and subsequent copies.

15. The method according to claim 13, wherein said second storage means compresses and stores the image data.

16. The method according to claim 13, wherein said print means is color print means having a density correction function, and the selection step includes a step of selecting the first method irrespective of the result in the comparison step when print data is color data.

17. The method according to claim 13, wherein the selection step includes a step of selecting the print method for each print page.

18. The method according to claim 13, wherein the selection step includes a step of selecting, when one of the first and second methods is designated as the print method, the designated method as the print method.

19. The method according to claim 13, further comprising a correction input step of externally inputting density correction data, and wherein the image generation step includes a step of reading out, when density correction data is externally input, the print data from said first storage means, generating the image data again in accordance with the input density correction data, and storing the generated image data in said second storage means irrespective of the print method selected.

20. The method according to claim 19, further comprising a step of reading an image printed on a paper sheet during a print process, and a step of generating density correction data on the basis of the read image.

21. The method according to claim 13, wherein the image generation step includes a step of reading out, when the second method is selected as the print method, the print data from said first storage means at a predetermined timing, analyzing the data to generate image data, and storing the generated image data in said second storage means to update old data.

22. The method according to claim 13, further comprising a re-print step of holding the print data of said first storage means, the image data of said second storage means, and the measurement results in the first and second measurement steps, and printing in accordance with a re-print instruction.

23. The method according to claim 13, further comprising a step of reading out the print data from said first storage means during a print data waiting time, analyzing the data in the image generation step to generate image data, and storing the image data in said second storage means to update old data.

24. The method according to claim 14, wherein a predetermined value is pre-stored as the second time, the first time and the predetermined-value are compared without holding the image data upon printing the first copy, and the selection step includes a step of selecting as the print method the first method when the first time is smaller than the predetermined value or the second method when the first time is larger than the predetermined value.

25. A computer-executable program stored on a computer-readable medium for making a computer control a printing apparatus which has print means, and a multi-copy print function, comprising:
a first storage step of storing print data in first storage means;
an image generation step of reading out the print data from said first storage means, and generating image data;
a second storage step of storing the image data in second storage means;
a first measurement step of measuring a first time required for generating the image data in the image generation step;
a second measurement step of measuring a second time required for reading out the image data from said second storage means;
a comparison step of comparing the first and second times; and
a selection step of selecting as a print method a first method which prints based on the print data stored in said first storage means for each copy, and a second method that prints based on the image data stored in said second storage means for each copy, on the basis of the result in the comparison step,
wherein the selection step includes a step of always selecting a predetermined one of the first and second methods irrespective of the result in the comparison step when the print data indicates a predetermined mode.

26. The computer-executable program stored on a computer-readable medium according to claim 25, wherein the first and second measurement steps measure the first and second times upon printing a first copy of a plurality of copies, and the selection step includes a step of determining the print method for second and subsequent copies.

27. The computer-executable program stored on a computer-readable medium according to claim 25, wherein said second storage means compresses and stores the image data.

28. The computer-executable program stored on a computer-readable medium according to claim 25, wherein said print means is color print means having a density correction function, and the selection step includes a step of selecting the first method irrespective of the result in the comparison step when print data is color data.

29. The computer-executable program stored on a computer-readable medium according to claim 25, wherein the selection step includes a step of selecting the print method for each print page.

30. The computer-executable program stored on a computer-readable medium according to claim 25, wherein the selection step includes a step of selecting, when one of the first and second methods is designated as the print method, the designated method as the print method.

31. The computer-executable program stored on a computer-readable medium according to claim 25, further comprising a correction input step of externally inputting density correction data, and wherein the image generation step includes a step of reading out, when density correction data is externally input, the print data from said first storage means, generating the image data again in accordance with the input density correction data, and storing the generated image data in said second storage means irrespective of the print method selected.

32. The computer-executable program stored on a computer-readable medium according to claim 31, further comprising a step of reading an image printed on a paper sheet during a print process, and a step of generating density correction data on the basis of the read image.

33. The computer-executable program stored on a computer-readable medium according to claim 25, wherein the image generation step includes a step of reading out, when the second method is selected as the print method, the print data from said first storage means at a predetermined timing, analyzing the data to generate image data, and storing the generated image data in said second storage means to update old data.

34. The computer-executable program stored on a computer-readable medium according to claim 25, further comprising a re-print step of holding the print data of said first storage means, the image data of said second storage means, and the measurement results in the first and second measurement steps, and printing in accordance with a re-print instruction.

35. The computer-executable program stored on a computer-readable medium according to claim 25, further comprising a step of reading out the print data from said first storage means during a print data waiting time, analyzing the data in the image generation step to generate image data, and storing the image data in said second storage means to update old data.

36. The computer-executable program stored on a computer-readable medium according to claim 26, wherein a predetermined value is pre-stored as the second time, the first time and the predetermined value are compared without holding the image data upon printing the first copy, and the selection step includes a step of selecting as the print method the first method when the first time is smaller than the predetermined value or the second method when the first time is larger than the predetermined value.

* * * * *

UNITED STATES PATENT AND TRADEMARK OFFICE
CERTIFICATE OF CORRECTION

PATENT NO. : 6,999,186 B2  Page 1 of 1
APPLICATION NO. : 09/934854
DATED : February 14, 2006
INVENTOR(S) : Takeshi Utsunomiya It is certified that error appears in the above-identified patent and that said Letters Patent is hereby corrected as shown below:

Title Page
Item (54) "IT'S" should read --ITS --.

COLUMN 1:
Line 2, "IT'S" should read -- ITS --.

COLUMN 10:
Line 7, "quicker" should read -- quickly --.

COLUMN 14:
Line 57, "quicker" should read -- quickly --; and
Line 65, "done" should read -- done at --.

COLUMN 16:
Line 26, "quicker" should read -- quickly --.

COLUMN 18:
Line 40, "value-" should read -- value --;
Line 51, "means; a first" should read --means; ¶ a first --; and
Line 65, "step, wherein" should read -- step, ¶ wherein --.

COLUMN 19:
Line 55, "predetermined-value" should read -- predetermined value --; and Signed and Sealed this Twenty-eighth Day of November, 2006

JON W. DUDAS
*Director of the United States Patent and Trademark Office*